United States Patent
Zhou

(10) Patent No.: US 9,565,052 B2
(45) Date of Patent: Feb. 7, 2017

(54) METHOD AND SYSTEM FOR REALIZING APPLICATION DETECTION AND CONTROL IN IP-CAN SESSION SUPPORTING DUAL STACK

(75) Inventor: Xiaoyun Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 215 days.

(21) Appl. No.: 13/978,603

(22) PCT Filed: Dec. 31, 2011

(86) PCT No.: PCT/CN2011/085211
§ 371 (c)(1),
(2), (4) Date: Jul. 8, 2013

(87) PCT Pub. No.: WO2012/097676
PCT Pub. Date: Jul. 26, 2012

(65) Prior Publication Data
US 2013/0297812 A1    Nov. 7, 2013

(30) Foreign Application Priority Data

Jan. 18, 2011  (CN) .......................... 2011 1 0020191
Apr. 29, 2011  (CN) .......................... 2011 1 0118972

(51) Int. Cl.
*H04L 29/08* (2006.01)
*H04M 15/00* (2006.01)
(Continued)

(52) U.S. Cl.
CPC ......... *H04L 29/0863* (2013.01); *H04L 69/167* (2013.01); *H04M 15/66* (2013.01);
(Continued)

(58) Field of Classification Search
CPC ................................................. H04L 29/0863
(Continued)

(56) References Cited

U.S. PATENT DOCUMENTS

2012/0246325 A1*  9/2012  Pancorbo Marcos et al. ............................ 709/227
2013/0088966 A1*  4/2013  Mahkonen et al. .......... 370/235

FOREIGN PATENT DOCUMENTS

| CN | 101267319 A | 9/2008 |
| CN | 101296169 A | 10/2008 |
| CN | 101459951 A | 6/2009 |
| CN | 101582777 A | 11/2009 |
| CN | 101583114 A | 11/2009 |
| WO | 2010020637 A1 | 2/2010 |

OTHER PUBLICATIONS

Technical Specification Group Services and Systems Aspects; Study on Policy Solutions and Enhancements, 3rd Generation Partnership Project, 3GPP TR 23.813 Vo. 3.0, Sep. 2010, 26 Pages.
(Continued)

*Primary Examiner* — Vivek Srivastava
*Assistant Examiner* — Sibte Bukhari
(74) *Attorney, Agent, or Firm* — Lando & Anastasi, LLP

(57) ABSTRACT

The disclosure provides a method and a system for realizing application detection and control in an IP-Connectivity Access Network (IP-CAN) session supporting dual stack. The method includes: a Policy and Charging Rules Function (PCRF) informs a Traffic Detection Function (TDF) of an IPv4 address via a TDF session established for the IP-CAN session if a gateway where the PCEF is located or another external network element allocates the IPv4 address according to a request of the UE and the UE accesses a service using the IPv4 address, after the UE establishes the IP-CAN session and accesses a service using an IPv6 address in the IP-CAN session supporting dual stack; and the TDF performs application detection and control on traffic, of which the source address and/or the destination address is/are the IPv4 address, according to an Application Detection and Control (ADC) rule related to the TDF session. With the method of the disclosure, the PCRF will no longer initiate a request for establishing a new TDF session, in this way, the service detection for one same IP-CAN session needs to be
(Continued)

reported via one same TDF session only, thus, resources are saved and signalling overhead is reduced.

11 Claims, 6 Drawing Sheets

(51) Int. Cl.
*H04L 29/06* (2006.01)
*H04L 29/12* (2006.01)
*H04L 12/14* (2006.01)

(52) U.S. Cl.
CPC ...... *H04L 12/1407* (2013.01); *H04L 61/2007* (2013.01); *H04L 61/6086* (2013.01)

(58) Field of Classification Search
USPC .......................................................... 709/228
See application file for complete search history.

(56) References Cited

OTHER PUBLICATIONS

Laganier et al; Implement All IP Core Network of Mobile Management Techniques; Oct. 1, 2009; 9 Pages.
English Translation of the Written Opinion of the International Search Authority in International Application No. PCT/CN2011/085211, mailed Apr. 12, 2012, 9 pages.
International Search Report for International Application No. PCT/CN2011/085211, mailed Apr. 12, 2012, 2 pages.
"3rd Generation Partnership Project; Technical Specification Group Services and System Aspects; Policy and Charging Control Architecture (Release 11)," 3GPP TS 23.203 V11.0.0, Technical Specification, (2010).

\* cited by examiner

METHOD AND SYSTEM FOR REALIZING APPLICATION DETECTION AND CONTROL IN IP-CAN SESSION SUPPORTING DUAL STACK

TECHNICAL FIELD

The disclosure relates to policy and charging technique, and in particular to a method and a system for realizing application detection and control in an IP-Connectivity Access Network (IP-CAN) session supporting dual stack.

BACKGROUND

Since the $3^{rd}$ Generation Partnership Project Release7 (3GPP Release7) standard system is proposed, the policy and charging function is realized by a Policy and Charging Control (PCC) framework. The PCC framework is a function framework applicable to multiple access technologies, for example, the PCC framework is applicable to a Universal Mobile Telecommunications System (UMTS) Terrestrial Radio Access Network (UTRAN), an Enhanced Data Rate for GSM (Global System for Mobile Communication) Evolution (EDGE) radio access network, an Intelligent Wireless Local Area Network (I-WLAN) and an Evolved Packet System (EPS), etc.

The PCC mainly realizes two functions, that is, policy control function and charging function. FIG. 1 shows a schematic diagram of a PCC framework in existing Release-11; hereinafter, each logical function entity and the interface function thereof in the PCC framework shown in FIG. 1 are described. As shown in FIG. 1:

Application Function (AF) is configured to provide an access point of service application, wherein network resources used by the service application need to be processed with dynamical policy control. When parameter negotiation is conducted on a service plane, the AF transmits related service information to a Policy and Charging Rules Function (PCRF). If the service information is consistent with the policy of the PCRF, the PCRF accepts the negotiation; otherwise, the PCRF rejects the negotiation, and provides a service parameter acceptable by the PCRF during feedback; subsequently, the AF returns the parameter to User Equipment (UE), wherein the interface between the AF and the PCRF is an Rx interface.

The PCRF is the core of the PCC and is responsible for establishing policy and charging rules. The PCRF provides network control rules based on a service data flow, wherein the network control includes detection, gating control, Quality of Service (QoS) control of the service data flow, and charging based on the data flow. The PCRF sends the policy and charging rules established by the PCRF itself to a Policy and Charging Enforcement Function (PCEF) to execute, meanwhile, the PCRF needs to guarantee the consistency between the rules and the subscription information of a user. The basis for the PCRF to establish the policy and charging rules includes: receiving service related information from the AF, obtaining user subscription information of PCC related to policy control and charging from a Subscription Profile Repository (SPR), and obtaining bearer related network information from the PCEF.

The PCEF generally is located inside a Gate-Way (GW) and is used for enforcing the policy and charging rules established by the PCRF on a bearer plane. The PCEF performs detection on service data flows according to a service data flow filter in the rules sent by the PCRF, thereby enforcing the policy and charging rules established by the PCRF for the service data flow. When a bearer is established, the PCEF allocates resources according to the rules sent by the PCRF and performs gating control according to the information provided by the AF; meanwhile, the PCEF triggers the report of events occurring on a bearer network according to an event subscribed by the PCRF; according to the charging rules sent by the PCRF, the PCEF executes a corresponding service data flow charging operation, wherein the charging can be online charging or offline charging. If in the online charging, the PCEF needs to perform credit management together with an Online Charging System (OCS); if in the offline charging, the PCEF exchanges related charging information with an Offline Charging System (OFCS). The interface between the PCEF and the PCRF is a Gx interface; the interface between the PCEF and the OCS is a Gy interface; and the interface between the PCEF and the OFCS is a Gz interface. The PCEF also can have a Traffic Detection Function (TDF). The PCEF can perform application detection and policy enforcement (for example, gating control, redirection and bandwidth limit) according to local configurations or PCC rules containing an Application Detection and Control (ADC) policy distributed by the PCRF. The PCEF generally is located on a network gateway, such as, a Packet Data Network Gateway (PDN-GW) of EPS, a General Packet Radio Service (GPRS) Gateway Support Node (GGSN), and a Packet Data Gateway (PDG) in an Interworking Wireless Local Area Network (I-WLAN).

The TDF also can be deployed separately; at this time, the TDF is connected with the PCRF through an Sd interface; the TDF can perform application detection and policy enforcement according to an ADC rule preconfigured or distributed by the PCRF.

Bearer Binding and Event Reporting Function (BBERF) generally is located in an access network gateway. For example, when UE accesses the EPS through an Evolved UTRAN (E-UTRAN) and Proxy Mobile Internet Protocol version6 (PMIPv6) is applied between a Serving Gateway (S-GW) and a Packet Data Network-Gateway (P-GW), the BBERF exists in the S-GW. When UE accesses the EPS through an untrusted non-3GPP access network, the BBERF also exists in the untrusted non-3GPP access gateway.

The SPR stores the user subscription information of PCC related to policy control and charging. The interface between the SPR and the PCRF is an Sp interface.

The OCS and the PCEF together accomplish the user credit control and management in the online charging mode.

The OFCS and the PCEF together accomplish the charging operation in the offline charging mode.

FIG. 2 shows a flowchart of establishing a TDF session between a TDF and a PCRF in an existing IP-CAN session process, in which the TDF applies a non-requested report mode. As shown in FIG. 2, the process specifically includes the following steps:

Step 201: during the process of UE requesting establishment of an IP-CAN session, a gateway where a PCEF is located receives an IP-CAN session establishment request message, wherein the IP-CAN session establishment request message carries a user Identifier (ID), and a PDN ID of the PDN network which the user requests to access;

Step 202: the PCEF sends a message of indication of IP-CAN session establishment to the PCRF, and makes the message of indication of IP-CAN session establishment carry the user ID, the PDN ID and an IPv6 address prefix allocated for the UE;

Step 203: after determining that there is no subscription information of the user according to the user ID, the PCRF sends a subscription document request to an SPR and makes the subscription document request carry the user ID and the PDN ID;

Step 204: the SPR returns corresponding user subscription information (through a subscription document response) according to the user ID and the PDN ID;

Step 205: the PCRF makes a policy (including establishing PCC rules and event triggers) according to returned user subscription information, network policy, UE access information and the like;

Step 206: the PCRF sends an acknowledge IP-CAN session establishment message to the PCEF and makes the acknowledge IP-CAN session establishment message carry the PCC rules and event triggers;

Step 207: the PCEF installs the policy; the gateway where the PCEF is located returns an IP-CAN session establishment response to the UE and makes the IP-CAN session establishment response carry the IPv6 address prefix;

through the process shown in FIG. 2, the UE can construct an IPv6 address according to the IPv6 address prefix and access a service using the IPv6 address;

Step 208: the TDF finds a new IPv6 address (this IPv6 address is constructed by the UE according to the IPv6 address prefix in Step 207) when detecting traffic which pass through the TDF, then, the TDF sends a TDF session establishment message to the PCRF and makes the TDF session establishment message carry the new IPv6 address; and Step 209: the PCRF associates the TDF session with the IP-CAN session according to the IPv6 address prefix obtained from the PCEF and the IPv6 address obtained from the TDF, and returns a TDF session establishment acknowledgement message to the TDF; the established TDF session corresponds to the IP-CAN session established by the UE.

Hereafter, the TDF performs application detection and control on uplink traffic, of which the source address is the new IPv6 address, and/or downlink traffic, of which the destination address is the new IPv6 address, according to the preconfigured ADC rule; and the TDF detects an appointed application (marked by Application ID) in the preconfigured application detection policy. The TDF sends an application detection report to the PCRF via the TDF session established in Step 208 and Step 209, carrying the detected Application ID and an optional event trigger which takes Start of application traffic detection and Stop of application traffic detection as a value; if the PCRF subscribes to the event trigger Start of application traffic detection and Stop of application traffic detection with the TDF, the TDF probably would provide Service Data Flow Description for the PCRF. Then, the PCRF makes a policy, makes or updates PCC rules according to the Application ID and the Service Data Flow Description (if reported) reported by the TDF, and provides the policy and rules to the PCEF.

However, the existing technology does not take dual-stack into account, that is, one same IP-CAN session has an IPv4 address and an IPv6 address simultaneously. After the process shown in FIG. 2, if the gateway where the PCEF is located or another external network element further allocates an IPv4 address according to a request from UE and the UE accesses a service using the IPv4 address, at this time, the TDF finds a new IPv4 address, initiates establishment of a TDF session and reports an application detection result to the PCRF via the established TDF session.

This could cause a result that an IP-CAN session has two TDF sessions simultaneously, and the service detection for the same one IP-CAN session needs to be reported via different TDF sessions. Thus, resources are wasted and signalling overhead is increased.

In addition, the standalone TDF supporting solicited application reporting mode will encounter this problem too; at this time, the process of establishing a TDF session, as shown in FIG. 3, includes the following steps:

Step 301: during the process of UE requesting establishment of an IP-CAN session, a gateway where the PCEF is located receives an IP-CAN session establishment request message, wherein the IP-CAN session establishment request message carries a user ID, and a PDN ID of the PDN network which the user requests to access;

Step 302: the PCEF sends a message of indication of IP-CAN session establishment to a PCRF, and makes the message of indication of IP-CAN session establishment carry the user ID, the PDN ID and an IPv6 address prefix allocated for the UE;

Step 303: after determining that there is no subscription information of the user according to the user ID, the PCRF sends a subscription document request to an SPR and makes the subscription document request carry the user ID and the PDN ID;

Step 304: the SPR returns corresponding user subscription information (through a subscription document response) according to the user ID and the PDN ID; the user subscription information includes a user document configuration, instructing to activate application detection and control;

Step 305: the PCRF makes a policy (including establishing PCC rules and optional event triggers) according to returned user subscription information, network policy, UE access information and the like; in this step, since the user subscription information includes the user document configuration, the PCRF also needs to establish an ADC rule, wherein the ADC rule includes: setting an Application ID used for indicating the application needed to be detected by the PCEF, setting an event trigger which takes Start of application traffic detection and Stop of application traffic detection as a value, and setting possible enforcement policy corresponding to each detected application, including gating control, maximum bandwidth and redirection;

Step 306: the PCRF sends a TDF session establishment request to the TDF, and makes the TDF session establishment request message carry the IPv6 address prefix, the ADC rule and the optional event trigger, wherein the event trigger takes Start of application traffic detection and Stop of application traffic detection as a value;

Step 307: the TDF enforces the policy, installs or activates the ADC rule and the event trigger;

Step 308: the TDF returns a TDF session establishment acknowledgement message to the PCRF;

Step 309: the PCRF sends an acknowledge IP-CAN session establishment message to the PCEF, and makes the acknowledge IP-CAN session establishment message carry the PCC rules and the event trigger; and Step 310: the PCEF installs the policy; the gateway where the PCEF is located returns an IP-CAN session establishment response to the UE, and makes the IP-CAN session establishment response carry the IPv6 address prefix.

Through the process shown in FIG. 3, the UE can construct an IPv6 address according to the IPv6 address prefix, and access a service using the IPv6 address. The established TDF session corresponds to the IP-CAN session established by the UE.

Hereafter, the TDF performs application detection and control on uplink traffic, of which the source address is the IPv6 address (which can be uniquely determined by the TDF according to the IPv6 address prefix obtained from the PCRF), and/or downlink traffic, of which the destination address is the IPv6 address, according to the ADC rule distributed by the PCRF. When the TDF detects an application corresponding to the Application ID and the PCRF subscribes to Start of application traffic detection and Stop of application traffic detection, the TDF sends an application detection report to the PCRF via the TDF session established in Step 306 to Step 308, carrying the detected Application ID and the event trigger which takes Start of application traffic detection as a value; then, the PCRF makes a policy, sets or updates the enforcement policy (for example, gating control, maximum bandwidth and redirection) according to the reported Application ID, establishes or updates PCC rules and provides the rules to the PCEF.

After the process shown in FIG. 3, if the gateway where the PCEF is located or another external network element further allocates an IPv4 address according to a request from the UE, and the UE accesses a service using the IPv4 address, at this time, the TDF finds a traffic of a new IPv4 address when detecting the traffic; since the TDF is not notified to detect the traffic of the IPv4 address and has no corresponding ADC rule used for detecting the service flow, the TDF will not detect the traffic. At this time, the PCRF can initiate a request of establishing a new TDF session, subsequently causing that an IP-CAN session has two TDF sessions simultaneously, and the service detection for the same one IP-CAN session needs to be reported via different TDF sessions. Thus, resources are wasted and signalling overhead is increased.

SUMMARY

In view of the above, the main purpose of the disclosure is to provide a method for realizing application detection and control in an IP-CAN session supporting dual stack, which can save resources and reduce signalling overhead.

In order to achieve the purpose above, the technical scheme of the disclosure is realized as follows.

The disclosure provides a method for realizing application detection and control in an IP-CAN session supporting dual stack, including: obtaining an IPv4 address by UE after the UE establishes an IP-CAN session and obtains an IPv6 address;

and the method further includes: informing, by a PCRF, a TDF of an allocated IPv4 address via a TDF session established for the IP-CAN session; and associating, by the TDF, an obtained IPv4 address with the established TDF session.

Further, after the TDF associates the IPv4 address with the TDF session, the method may further include: reporting, by the TDF, detected application information related to the IPv4 address to the PCRF via the TDF session if the PCRF subscribes to an event trigger for Start of application traffic detection and Stop of application traffic detection.

Further, the method may further include: performing, by the TDF, application detection and control on traffic, of which a source address and/or a destination address is/are the IPv4 address, according to an ADC rule related to the TDF session.

Further, the method may further include: the ADC rule related to the TDF session includes an ADC rule applied to an IPv6 address and/or an ADC rule separately applied to an IPv4 address of the IP-CAN session.

Further, the method may further include: when the IPv4 address is released, informing, by the PCRF, the TDF of the released IPv4 address via the TDF session established for the IP-CAN session; disassociating, by the TDF, the IPv4 address from the TDF session.

Further, informing, by the PCRF, the TDF of the released IPv4 address via the TDF session established for the IP-CAN session may include: sending, by a PCEF, a message of indication of IP-CAN session modification to the PCRF, and making the message of indication of IP-CAN session modification carry an IP address release indicator and a released IPv4 address; releasing, by the PCRF, the IPv4 address carried in the message of indication of IP-CAN session modification and returning an acknowledgement message to the PCEF;

sending, by the PCRF, a TDF session modification request to the TDF via the TDF session established for the IP-CAN session, and making the TDF session modification request message carry the IP address release indicator and the released IPv4 address.

Further, informing, by the PCRF, the TDF of the allocated IPv4 address via the TDF session established for the IP-CAN session may include:

sending, by the PCEF, a message of indication of IP-CAN session modification to the PCRF, and making the message of indication of the IP-CAN session modification carry an IP address allocation indicator and an allocated IPv4 address; storing, by the PCRF, the IPv4 address carried in the message of indication of IP-CAN session modification and returning an acknowledgement message to the PCEF;

sending, by the PCRF, a TDF session modification request to the TDF via the TDF session established for the IP-CAN session, and making the TDF session modification request message carry the IP address allocation indicator and the allocated IPv4 address.

The disclosure provides a system for realizing application detection and control in an IP-CAN session supporting dual stack, which at least includes a PCRF, a PCEF, a TDF and UE, wherein the UE is configured to establish an IP-CAN session and to obtain an IPv6 address;

the PCEF is configured to send a message of indication of IP-CAN session modification to the PCRF, and to make the message of indication of IP-CAN session modification carry an IP address allocation indicator and the allocated IPv4 address;

the PCRF is configured to store the IPv4 address carried in the message of indication of IP-CAN session modification and to return an acknowledgement message to the PCEF, to send a TDF session modification request to the TDF via a TDF session established for the IP-CAN session and to make the TDF session modification request message carry the IP address allocation indicator and the allocated IPv4 address;

the TDF is configured to associate the IPv4 address with the TDF session, and to perform application detection and control on traffic, of which a source address and/or a destination address is/are the IPv4 address, according to an ADC rule related to the TDF session.

Further, the TDF may be further configured to report detected application information related to the IPv4 address to the PCRF via the TDF session if the PCRF subscribes to an event trigger for Start of application traffic detection and Stop of application traffic detection with the TDF.

Further, the PCEF may be further configured to send a message of indication of IP-CAN session modification to the PCRF, and to make the message of indication of IP-CAN session modification carry an IP address release indicator and a released IPv4 address;

the PCRF may be further configured to release the IPv4 address carried in the message of indication of IP-CAN session modification and to return an acknowledgement message to the PCEF, to send a TDF session modification request to the TDF via the TDF session established for the IP-CAN session and to make the TDF session modification request message carry the IP address release indicator and the released IPv4 address;

the TDF may be further configured to disassociate the IPv4 address from the TDF session and to return an acknowledgement to the PCRF.

The disclosure provides a TDF, which is configured to associate an IPv4 address sent by a PCRF with a TDF session, and to perform application detection and control on traffic, of which a source address and/or a destination address is/are the IPv4 address, according to an ADC rule related to the TDF session.

Further, the TDF may be further configured to report detected application information related to the IPv4 address to the PCRF via the TDF session if the PCRF subscribes to an event trigger for Start of application traffic detection and Stop of application traffic detection with the TDF.

Based on another aspect of the disclosure, another purpose of the disclosure is to provide a method for informing a TDF of a UE IP address, so that the TDF can obtain an IPv4 address after the UE obtains the IPv4 address.

In order to achieve another purpose above, another technical scheme of the disclosure is realized as follows.

The disclosure provides a method for informing a TDF of a UE IP, including: establishing an IP-CAN session; informing, by a PCEF, a PCRF of a new IPv4 address allocated for the UE; informing, by the PCRF, the TDF of the IPv4 address via an established TDF session corresponding to the IP-CAN session.

Further, informing, by the PCEF, the PCRF of the new IPv4 address allocated for the UE may include: sending, by the PCEF, a notification message to the PCRF, wherein the notification message carries an IP address allocation indicator and the new IPv4 address allocated for the UE.

Further, informing, by the PCRF, the TDF of the new IPv4 address allocated for the UE via the established TDF session corresponding to the IP-CAN session may include: sending, by the PCRF, a notification message to the TDF via the established TDF session corresponding to the IP-CAN session, wherein the notification message carries an IP address allocation indicator and the new IPv4 address allocated for the UE.

Further, when the IPv4 address is released, the method may further include: informing, by the PCEF, the PCRF that the IPv4 address is released; informing, by the PCRF, the TDF that the IPv4 address is released via the established TDF session corresponding to the IP-CAN session.

The disclosure provides a system for informing a TDF of a UE IP, at least including a PCRF, a PCEF, a TDF and UE, wherein the UE is configured to establish an IP-CAN session;

the PCEF is configured to inform the PCRF of a new IPv4 address allocated for the UE;

the PCRF is configured to inform the TDF of the new IPv4 address allocated for the UE via an established TDF session corresponding to the IP-CAN session; and the TDF is configured to receive a notification from the PCRF to obtain the new IPv4 address allocated for the UE.

Further, the PCEF may be further configured to inform the PCRF that the IPv4 address is released, when the IPv4 address is released; the PCRF is further configured to inform the TDF that the IPv4 address is released via the TDF session established for the IP-CAN session.

The disclosure provides a PCRF, which is configured to inform a TDF of a new IPv4 address allocated for UE, via an established TDF session corresponding to an IP-CAN session, after a PCEF informs the PCRF of the new IPv4 address allocated for the UE.

Further, the PCRF may be also configured to inform the TDF that the IPv4 address is released via the TDF session established for the IP-CAN session, after the PCEF informs the PCRF that the IPv4 address is released.

From the above technical scheme provided by the disclosure, it can be seen that, in the method of the disclosure, the PCRF informs the TDF of an IPv4 address via a TDF session established for an IP-CAN session supporting dual stack, if a gateway where the PCEF is located or another external network element allocates the IPv4 address according to a request from the UE and the UE accesses a service using the IPv4 address, after the UE establishes the IP-CAN session and accesses a service using an IPv6 address in the IP-CAN session supporting dual stack; and the TDF performs application detection and control on traffic, of which the source address and/or the destination address is/are the IPv4 address, according to an ADC rule applied to an IPv6 address and/or an ADC rule separately applied to an IPv4 address of the established IP-CAN session. With the method of the disclosure, the PCRF will no longer initiate a request for establishing a new TDF session, in this way, the service detection for one same IP-CAN session needs to be reported via one same TDF session only, thus, resources are saved and signalling overhead is reduced.

DETAILED DESCRIPTION

Figure 3:
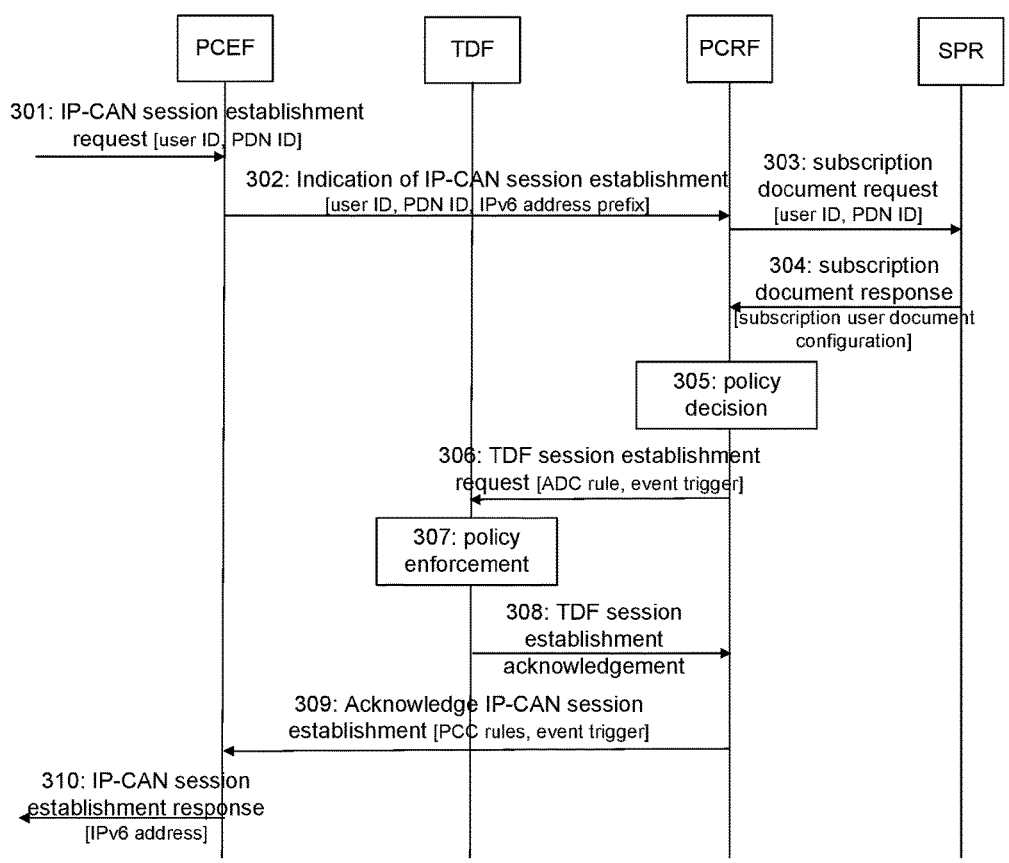
FIG. 3 shows another flowchart of establishing a TDF session between a TDF and a PCRF in an existing IP-CAN session process.
Figure 4:
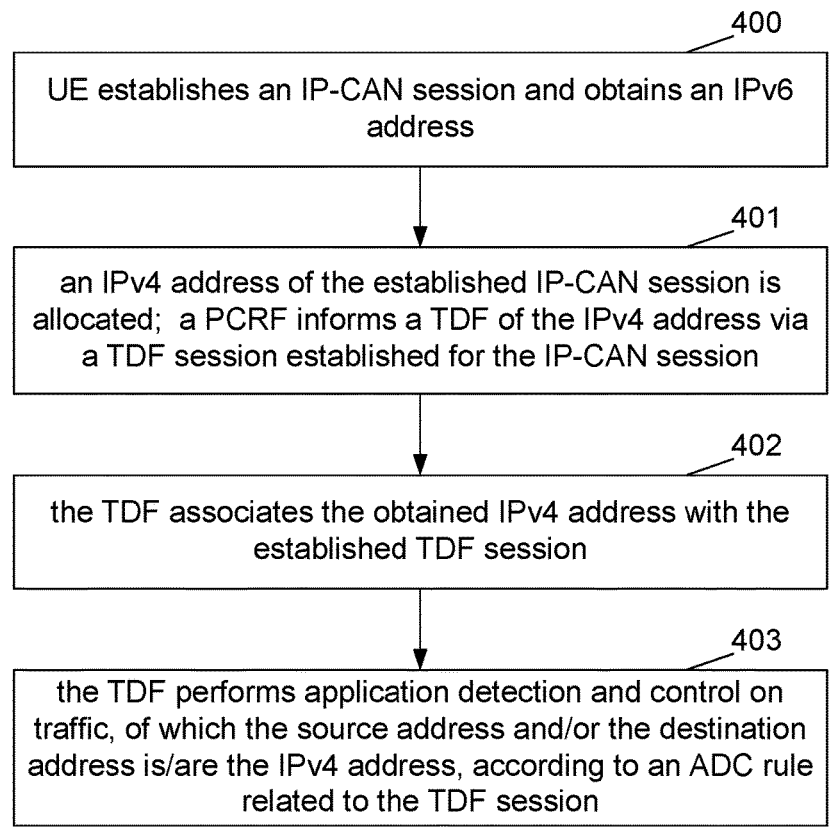
FIG. 4 shows a flowchart of a method for realizing application detection and control in an IP-CAN session supporting dual stack according to the disclosure.

FIG. 4 shows a flowchart of a method for realizing application detection and control in an IP-CAN session supporting dual stack according to the disclosure; as shown in FIG. 3, the process includes the following steps.

Figure 1:
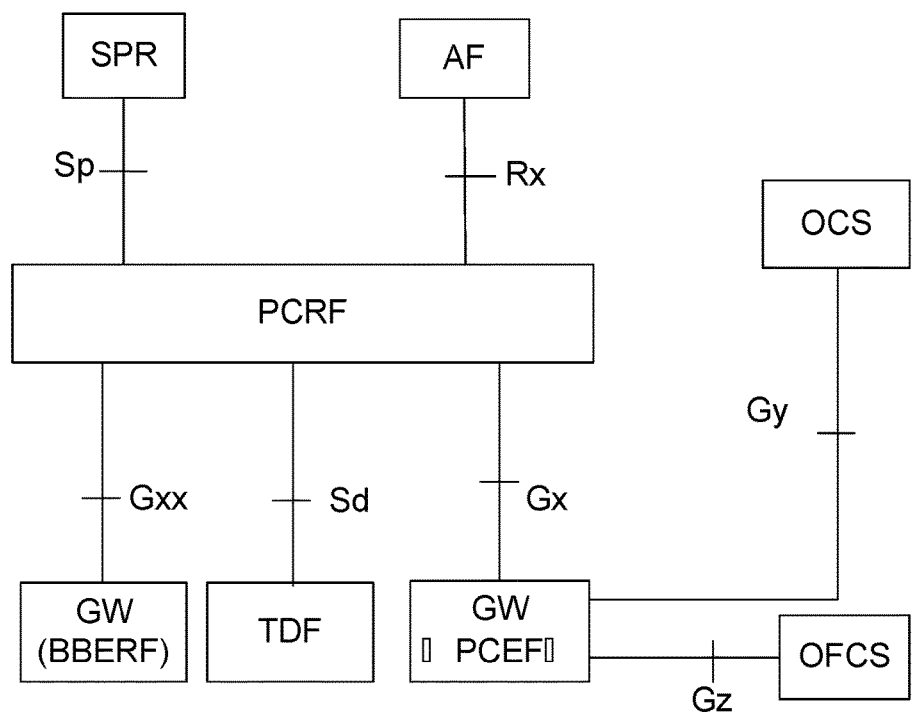
FIG. 1 shows a schematic diagram of a PCC framework in existing Rel-11.
Figure 2:
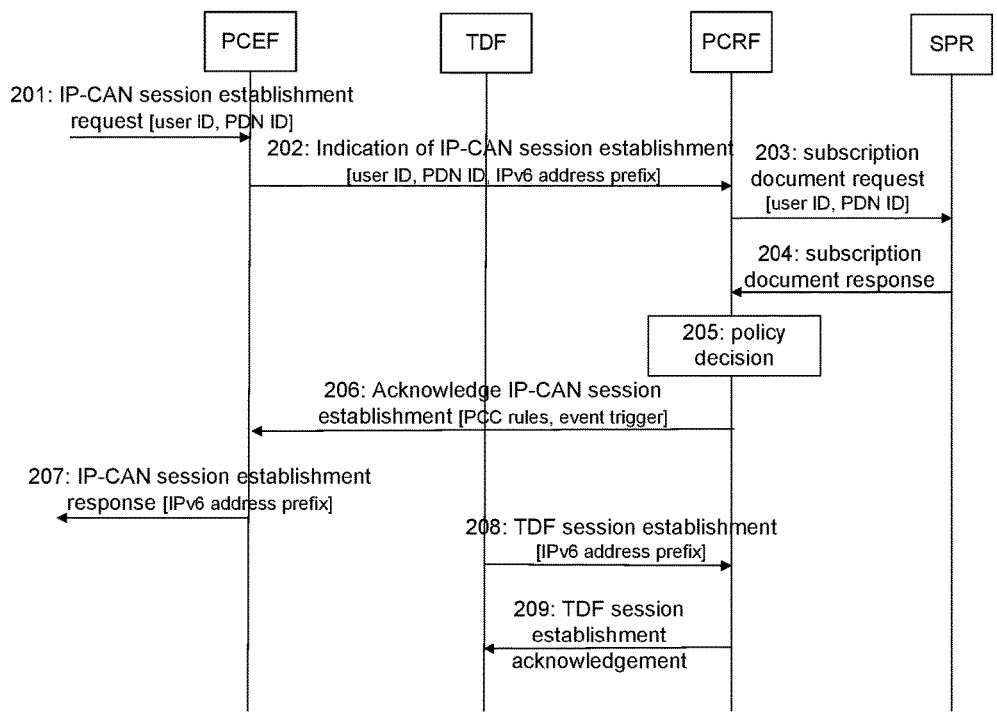
FIG. 2 shows a flowchart of establishing a TDF session between a TDF and a PCRF in an existing IP-CAN session process.

Step 400: UE establishes an IP-CAN session and obtains an IPv6 address, and accesses a service using the IPv6 address. This step belongs to an existing technology and the specific implementation is as shown in FIG. 2 and FIG. 3.

Step 401: An IPv4 address of the established IP-CAN session is allocated; a PCRF informs a TDF of the IPv4 address via a TDF session established for the IP-CAN session.

In this step, the allocation of the IPv4 address of the established IP-CAN session refers to that a gateway where a PCEF is located or another external network element allocates the IPv4 address according to a request from the UE and the UE accesses a service using the IPv4 address. At this time, the PCEF sends a message of indication of IP-CAN session modification to the PCRF, and makes the message of indication of IP-CAN session modification carry an IP address allocation indicator and the allocated IPv4 address; the PCRF stores the IPv4 address carried in the message of indication of IP-CAN session modification and returns an acknowledgement message to the PCEF;

the PCRF sends a TDF session modification request to the TDF via the TDF session established for the IP-CAN session, and makes the TDF session modification request message carry the IP address allocation indicator and the allocated IPv4 address.

Step 402: The TDF associates the obtained IPv4 address with the established TDF session, and stores the received IPv4 address.

Further, the method of the disclosure includes:

Step 403: The TDF performs application detection and control on traffic (also called user plane data), of which the source address and/or the destination address is/are the IPv4 address, according to an ADC rule related to the TDF session.

Step 403 may further include: if the PCRF subscribes to an event trigger for Start of application traffic detection and Stop of application traffic detection with the TDF, the TDF reports detected application information related to the IPv4 address to the PCRF via the TDF session. Here, how to detect out corresponding application information belongs to an existing technology, and the specific implementation does not limit the scope of protection of the disclosure.

When the IPv4 address is released, the method further includes: the PCRF informs the TDF of the released IPv4 address via the TDF session established for the IP-CAN session; the TDF releases the received IPv4 address and disassociates the IPv4 address from the established TDF session. The TDF stops applying the ADC rule related to the TDF session to traffic (also called user plane data) matched with the released IPv4 address to detect application information.

The specific implementation includes:

the PCEF sends a message of indication of IP-CAN session modification to the PCRF, and makes the message of indication of IP-CAN session modification carry an IP address release indicator and the released IPv4 address; the PCRF releases the IPv4 address carried in the message of indication of IP-CAN session modification and returns an acknowledgement message to the PCEF;

the PCRF sends a TDF session modification request to the TDF via the TDF session established for the IP-CAN session, and makes the TDF session modification request message carry the IP address release indicator and the released IPv4 address.

In the method provided by the disclosure, in an IP-CAN session supporting dual stack, the PCRF informs the TDF of an IPv4 address via a TDF session established for the IP-CAN session, if a gateway where the PCEF is located or another external network element allocates the IPv4 address according to a request from the UE and the UE accesses a service using the IPv4 address, after the UE establishes the IP-CAN session and accesses a service using an IPv6 address; and the TDF performs application detection and control on traffic, of which the source address and/or the destination address is/are the IPv4 address, according to an ADC rule applied to the IPv6 address and/or an ADC rule separately applied to the IPv4 address of the established IP-CAN session. With the method of the disclosure, the PCRF will no longer initiate a request for establishing a new TDF session, in this way, the application detection for one same IP-CAN session needs to be reported via one same TDF session only, thus, resources are saved and signalling overhead is reduced.

Figure 5:
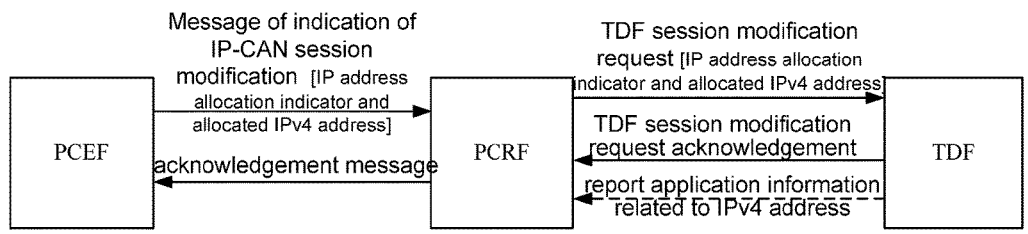
FIG. 5 shows a structure diagram of a system for realizing application detection and control in an IP-CAN session supporting dual stack according to the disclosure.

In view of the method of the disclosure, a system for realizing application detection and control in an IP-CAN session supporting dual stack is provided which, as shown in FIG. 5, at least includes a PCRF, a PCEF, a TDF and UE (not shown in the figure), wherein the UE is configured to establish an IP-CAN session and to access a service using an IPv6 address;

the PCEF is configured to send a message of indication of IP-CAN session modification to the PCRF, and make the message of indication of IP-CAN session modification carry an IP address allocation indicator and the allocated IPv4 address;

the PCRF is configured to store the IPv4 address carried in the message of indication of IP-CAN session modification and to return an acknowledgement message to the PCEF, send a TDF session modification request to the TDF via a TDF session established for the IP-CAN session and carry the IP address allocation indicator and the allocated IPv4 address in the TDF session modification request message;

the TDF is configured to associate the IPv4 address with the established TDF session and to store the received IPv4 address, and perform application detection and control on traffic, of which the source address and/or the destination address is/are the IPv4 address, according to an ADC rule related to the TDF session.

The TDF is further configured to return detected application information related to the IPv4 address to the PCRF via the TDF session, after the PCRF subscribes to an event trigger for Start of application traffic detection and Stop of application traffic detection with the TDF.

The PCEF is further configured to send a message of indication of IP-CAN session modification to the PCRF, and make the message of indication of IP-CAN session modification carry an IP address release indicator and the released IPv4 address.

The PCRF is further configured to release the IPv4 address carried in the message of indication of IP-CAN session modification and return an acknowledgement message to the PCEF, send a TDF session modification request to the TDF via the TDF session established for the IP-CAN session and make the TDF session modification request message carry the IP address release indicator and the released IPv4 address.

The TDF is further configured to disassociate the IPv4 address from the established TDF session, release the received IPv4 address and return an acknowledgement to the PCRF.

Correspondingly, the disclosure also provides a TDF, which is configured to associate an IPv4 address sent by a PCRF with a TDF session, and perform application detection and control on traffic, of which the source address and/or the destination address is/are the IPv4 address, according to an ADC rule related to the TDF session.

Here, the TDF is further configured to report detected application information related to the IPv4 address to the PCRF via the TDF session, if the PCRF subscribes to an event trigger for Start of application traffic detection and Stop of application traffic detection with the TDF.

The disclosure also provides a method for informing a TDF of a UE IP address, so that the TDF can obtain an IPv4 address when the UE obtains the IPv4 address. The method includes: establishing an IP-CAN session; informing, by a PCEF, a PCRF of a new IPv4 address allocated for the UE; informing, by the PCRF, the TDF of the IPv4 address via an established TDF session corresponding to the IP-CAN session.

Further, informing, by the PCEF, the PCRF of the new IPv4 address allocated for the UE includes: sending, by the PCEF, a notification message to the PCRF, wherein the notification message carries an IP address allocation indicator and the new IPv4 address allocated for the UE.

Further, informing, by the PCRF, the TDF of the new IPv4 address allocated for the UE via the TDF session established by the IP-CAN session includes: sending a notification message to the TDF via the TDF session established by the IP-CAN session, by the PCRF, wherein the notification message carries the IP address allocation indicator and the new IPv4 address allocated for the UE.

Further, when the IPv4 address is released, the method further includes: informing, by the PCEF, the PCRF that the IPv4 address is released; informing, by the PCRF, the TDF that the IPv4 address is released via the TDF session established by the IP-CAN session.

Correspondingly, the disclosure provides a PCRF, which is configured to inform a TDF of a new IPv4 address allocated for UE, via an established TDF session corresponding to an IP-CAN session, after a PCEF informs the PCRF of the new IPv4 address allocated for the UE.

Here, the PCRF is further configured to inform the TDF that the IPv4 address is released via the TDF session established for the IP-CAN session, after the PCEF informs the PCRF that the IPv4 address is released.

The disclosure also provides a system for informing a TDF of a UE IP address, which at least includes the PCEF, the UE, and the PCRF and the TDF which are mentioned above, wherein the UE is configured to establish an IP-CAN session; the PCEF is configured to inform the PCRF of a new IPv4 address allocated for the UE; the TDF is configured to receive a notification from the PCRF to obtain a new IPv4 address allocated for the UE.

Here, the PCEF, the PCRF and the TDF all participate in the process of the UE establishing the IP-CAN session.

Here, the PCEF is further configured to inform the PCRF that the IPv4 address is released, when the IPv4 address is released; the PCRF is further configured to inform the TDF that the IPv4 address is released via the TDF session established for the IP-CAN session.

The method of the disclosure is described below in further detail in conjunction with FIG. 6 and FIG. 7.

Figure 6:
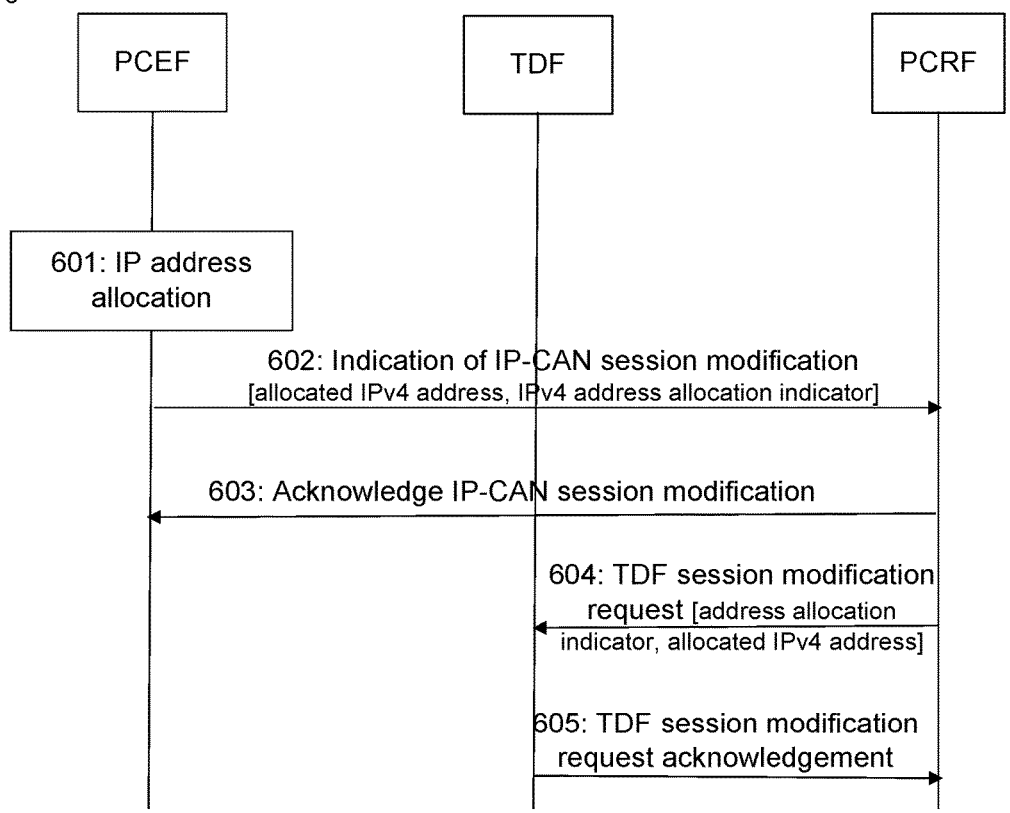
FIG. 6 shows a flowchart of a first embodiment of the method for realizing application detection and control in an IP-CAN session supporting dual stack according to the disclosure.

FIG. 6 shows a flowchart of a first embodiment of the method for realizing application detection and control in an IP-CAN session supporting dual stack according to the disclosure; in the first embodiment, supposing the TDF is standalone, a TDF session is established between the TDF and the PCEF according to the process shown in FIG. 2 or FIG. 3; then, when the IPv4 address is allocated, the method includes the following steps:

Step 601: a gateway where the PCEF is located or another network element further allocates an IPv4 address for the UE according to a request from the UE;

Step 602: the PCEF sends a message of indication of IP-CAN session modification to the PCRF, and makes the message of indication of IP-CAN session modification carry an IP address allocation indicator and the allocated IPv4 address; during specific implementation, the IP address allocation indicator is an event trigger of which the value includes UE_IP_ADDRESS_ALLOCATION;

Step 603: the PCRF returns an acknowledge IP-CAN session modification message to the PCEF after storing the IPv4 address;

Step 604: via the TDF session established in Step 208 to Step 209 in the process shown in FIG. 2 or in Step 306 to Step 308 in the process shown in FIG. 3, the PCRF sends a TDF session modification request to the TDF, and makes the TDF session modification request message carry the IP address allocation indicator and the allocated IPv4 address; during specific implementation, the session modification request message sent from the PCRF to the TDF carries an Event-Report-Indication Attribute Value Pair (AVP), wherein the AVP carries the allocated IPv4 address and an event trigger of which the value includes UE_IP_ADDRESS_ALLOCATION; and Step 605: the TDF learns that the UE is further allocated with an IPv4 address; after storing the new allocated IPv4 address, the TDF returns a TDF session modification request acknowledgement message to the PCRF.

Through the process shown in FIG. 6, the TDF learns that the IPv4 address and the previous IPv6 address belong to one same IP-CAN session. The TDF associates the IPv4 address with the established TDF session. The TDF performs application detection and control on uplink traffic (also called user plane data) of which the source address is the IPv4 address and/or downlink traffic of which the destination address is the IPv4 address according to the previous ADC rule (distributed by the PCRF or preconfigured by the PCEF) applied to the IPv6 address, and reports detected application and service data flow description via the TDF session established for the IPv6 address. In addition, the PCRF also can provide an ADC rule separately applied to the IPv4 address via the established TDF session. The TDF performs application detection and control according to the ADC rule separately applied to the IPv4 address provided by the PCRF or according to the ADC rule separately applied to the IPv4 address preconfigured locally by the PCEF. That is, the TDF performs application detection and control on uplink traffic (also called user plane data) of which the source address is the IPv4 address and/or downlink traffic of which the destination address is the IPv4 address according to the ADC rule (including the ADC rule for the IPv4 and/or IPv6) related to the TDF session. If the PCRF subscribes to an event trigger for Start of application traffic detection and Stop of application traffic detection with the TDF, the TDF also can return the detected application information related to the IPv4 address to the PCRF via the TDF session.

Figure 7:
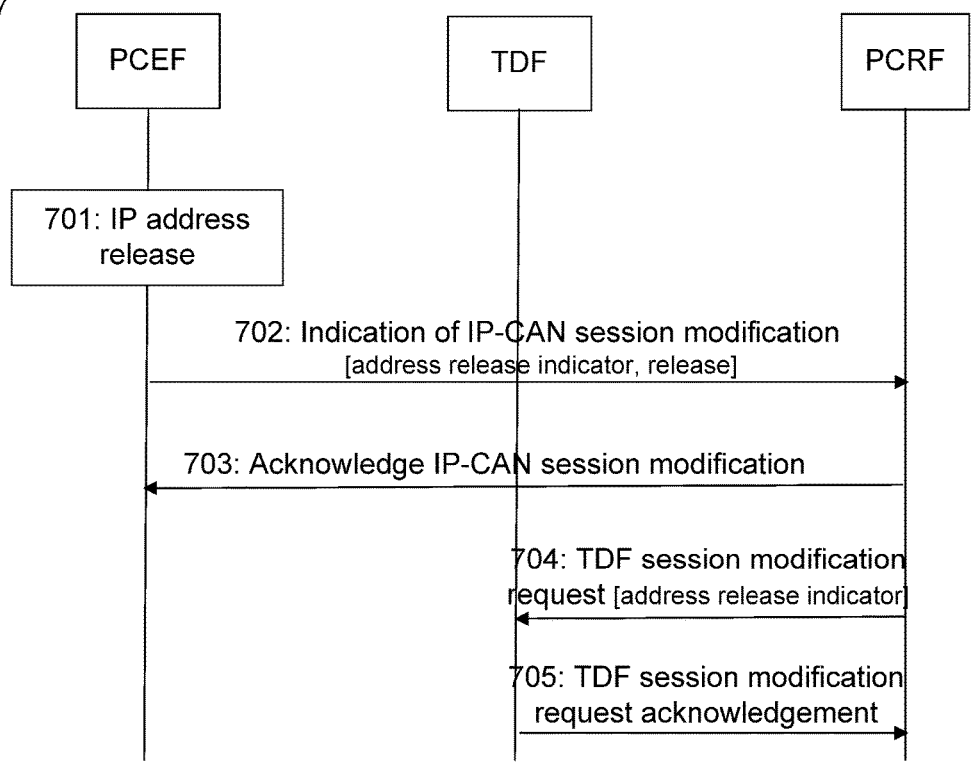
FIG. 7 shows a flowchart of a second embodiment of the method for realizing application detection and control in an IP-CAN session supporting dual stack according to the disclosure.

FIG. 7 shows a flowchart of a second embodiment of the method for realizing application detection and control in an IP-CAN session supporting dual stack according to the disclosure. In the second embodiment, supposing the TDF is standalone, a TDF session is established between the TDF and the PCEF according to the process shown in FIG. 2 or FIG. 3; then, when the IPv4 address is released, the method includes the following steps:

Step 701: a gateway where the PCEF is located or another network element releases the IPv4 address previously allocated for the UE;

Step 702: the PCEF sends a message of indication of IP-CAN session modification to the PCRF, and makes the message of indication of IP-CAN session modification carry an IP address release indicator and the released IPv4 address;

during specific implementation, the IP address allocation indicator is an event trigger of which the value includes UE_IP_ADDRESS RELEASE;

Step 703: the PCRF returns an acknowledge IP-CAN session modification message to the PCEF;

Step 704: via the TDF session established in Step 208 to Step 209 in the process shown in FIG. 2 or in Step 306 to Step 308 in the process shown in FIG. 3, the PCRF sends a TDF session modification request to the TDF, and makes the TDF session modification request message carry the IP address release indicator and the released IPv4 address; during specific implementation, the session modification request message sent from the PCRF to the TDF carries an Event-Report-Indication AVP, wherein the AVP carries the allocated IPv4 address and an event trigger of which the value includes UE_IP_ADDRESS_ALLOCATION; and Step 705: the TDF returns a TDF session modification request acknowledgement message to the PCRF.

Through the process shown in FIG. 7, the TDF learns that the IPv4 address previously allocated in the IP-CAN session is released, that is, the IPv4 address and the previous IPv6 address do not belong to one same IP-CAN session. The TDF disassociates the IPv4 address from the established TDF session. The TDF stops applying the ADC rule related to the TDF session to traffic (also called user plane data) matched with the released IPv4 address to detect application information.

The above are only the preferred embodiments of the disclosure and not intended to limit the scope of protection of the disclosure. Any modification, equivalent substitute and improvement made within the spirit and principle of the disclosure are deemed to be included within the scope of protection of the disclosure.

The invention claimed is:

1. A method for realizing application detection and control in an IP-Connectivity Access Network (IP-CAN) session supporting dual stack, comprising:
   establishing, by a User Equipment (UE), the IP-CAN session;
   constructing, by the UE, an IPv6 address according to an IPv6 address prefix received through the IP-CAN session;
   establishing, by a Traffic Detection Function (TDF) or a Policy and Charging Rules Function entity (PCRF), a TDF session corresponding to the IPv6 address;
   allocating, by a gateway where a Policy and Control Enforcement Function entity (PCEF) is located or another external network element, an IPv4 address to the UE according to a request from the UE;
   the method further comprising:
   informing, by the PCRF, the TDF of the IPv4 address via the TDF session corresponding to the IPv6 address; and
   associating, by the TDF, the IPv4 address with the TDF session corresponding to the IPv6 address;
   performing, by the TDF, application detection and control on traffic, of which a source address and/or a destination address is/are the IPv4 address, according to an Application Detection and Control (ADC) rule related to the TDF session;
   when the IPv4 address is released, informing, by the PCRF, the TDF of the released IPv4 address via the TDF session corresponding to the IPv6 address; and
   stopping, by the TDF, applying the ADC rule related to the TDF session to traffic matched with the released IPv4 address.

2. The method according to claim 1, further comprising: after the TDF associates the IPv4 address with the TDF session,
   reporting, by the TDF, detected application information related to the IPv4 address to the PCRF via the TDF session if the PCRF subscribes to an event trigger for Start of application traffic detection and Stop of application traffic detection with the TDF.

3. The method according to claim 1, further comprising:
   the ADC rule related to the TDF session includes an ADC rule applied to an IPv6 address and/or an ADC rule separately applied to an IPv4 address of the IP-CAN session.

4. The method according to claim 1, wherein informing, by the PCRF, the TDF of the released IPv4 address via the TDF session corresponding to the IPv6 address comprises:
   sending, by a Policy and Control Enforcement Function entity (PCEF), a message of indication of IP-CAN session modification to the PCRF, and making the message of indication of IP-CAN session modification carry an IP address release indicator and a released IPv4 address;
   releasing, by the PCRF, the IPv4 address carried in the message of indication of IP-CAN session modification and returning an acknowledgement message to the PCEF;
   sending, by the PCRF, a TDF session modification request to the TDF via the TDF session corresponding to the IPv6 address, and making the TDF session modification request message carry the IP address release indicator and the released IPv4 address.

5. The method according to claim 1, wherein informing, by the PCRF, the TDF of the allocated IPv4 address via the TDF session corresponding to the IPv6 address comprises:
   sending, by the PCEF, a message of indication of IP-CAN session modification to the PCRF, and making the message of indication of IP-CAN session modification carry an IP address allocation indicator and an allocated IPv4 address;
   storing, by the PCRF, the IPv4 address carried in the message of indication of IP-CAN session modification and returning an acknowledgement message to the PCEF;
   sending, by the PCRF, a TDF session modification request to the TDF via the TDF session corresponding to the IPv6 address, and making the TDF session modification request message carry the IP address allocation indicator and the allocated IPv4 address.

6. A system for realizing application detection and control in an IP-Connectivity Access Network (IP-CAN) session supporting dual stack, at least comprising a Policy and Charging Rules Function entity (PCRF), a Policy and Control Enforcement Function entity (PCEF), a Traffic Detection Function (TDF) a gateway where the PCEF is located or another external network element and User Equipment (UE), wherein;
   the UE is configured to establish an IP-CAN session and to construct an IPv6 address according to an IPv6 address prefix received through the IP-CAN session;
   the TDF or the PCRF is configured to establish a TDF session corresponding to the IPv6 address;
   the gateway where the PCEF is located or another external network element is configured to allocate an IPv4 address to the UE according to a request from the UE;

the PCRF is configured to inform the TDF of the IPv4 address via the TDF session corresponding to the IPv6 address;

the TDF is configured to associate the IPv4 address with the TDF session corresponding to the IPv6 address;

the TDF is configured for application detection and control on traffic, of which a source address and/or a destination address is/are the IPv4 address, according to an Application Detection and Control (ADC) rule related to the TDF session;

wherein when the IPv4 address is released, the PCRF is configured to inform the TDF of the released IPv4 address via the TDF session corresponding to the IPv6 address; and the TDF is configured for applying the ADC rule related to the TDF session to traffic matched with the released IPv4 address.

7. The system for realizing application detection and control in an IP-CAN session supporting dual stack according to claim 6, wherein the TDF is further configured to report detected application information related to the IPv4 address to the PCRF via the TDF session if the PCRF subscribes to an event trigger for Start of application traffic detection and Stop of application traffic detection with the TDF.

8. The system according to claim 6, wherein
the PCEF is further configured to send a message of indication of IP-CAN session modification to the PCRF, and to make the message of indication of IP-CAN session modification carry an IP address release indicator and a released IPv4 address;

the PCRF is further configured to release the IPv4 address carried in the message of indication of IP-CAN session modification and to return an acknowledgement message to the PCEF, to send a TDF session modification request to the TDF via the TDF session corresponding to the IPv6 address and to make the TDF session modification request message carry the IP address release indicator and the released IPv4 address;

the TDF is further configured to disassociate the IPv4 address from the TDF session and to return an acknowledgement to the PCRF;

the PCRF is further configured to: when the IPv4 address is released, inform the TDF of the released IPv4 address via the TDF session corresponding to the IPv6 address; and the TDF is further configured to stop applying the ADC rule related to the TDF session to traffic matched with the released IPv4 address.

9. The method according to claim 2, further comprising:
performing, by the TDF, application detection and control on traffic, of which a source address and/or a destination address is/are the IPv4 address, according to an Application Detection and Control (ADC) rule related to the TDF session.

10. The method according to claim 9, further comprising:
the ADC rule related to the TDF session includes an ADC rule applied to an IPv6 address and/or an ADC rule separately applied to an IPv4 address of the IP-CAN session.

11. The system according to claim 6, wherein the PCEF is configured to send a message of indication of IP-CAN session modification to the PCRF, and to make the message of indication of IP-CAN session modification carry an IP address allocation indicator and an allocated IPv4 address;

the PCRF is configured to store the IPv4 address carried in the message of indication of IP-CAN session modification and to return an acknowledgement message to the PCEF, to send a TDF session modification request to the TDF via a TDF session corresponding to the IPv6 address and make the TDF session modification request message carry the IP address allocation indicator and the allocated IPv4 address;

the TDF is configured to associate the IPv4 address with the TDF session, and to perform application detection and control on traffic, of which a source address and/or a destination address is/are the IPv4 address, according to an Application Detection and Control (ADC) rule related to the TDF session.

* * * * *